April 14, 1953  F. S. ELSAESSER  2,634,458
HAMBURG STEAK PATTY FORMING MACHINE
Filed Oct. 11, 1946  4 Sheets-Sheet 1
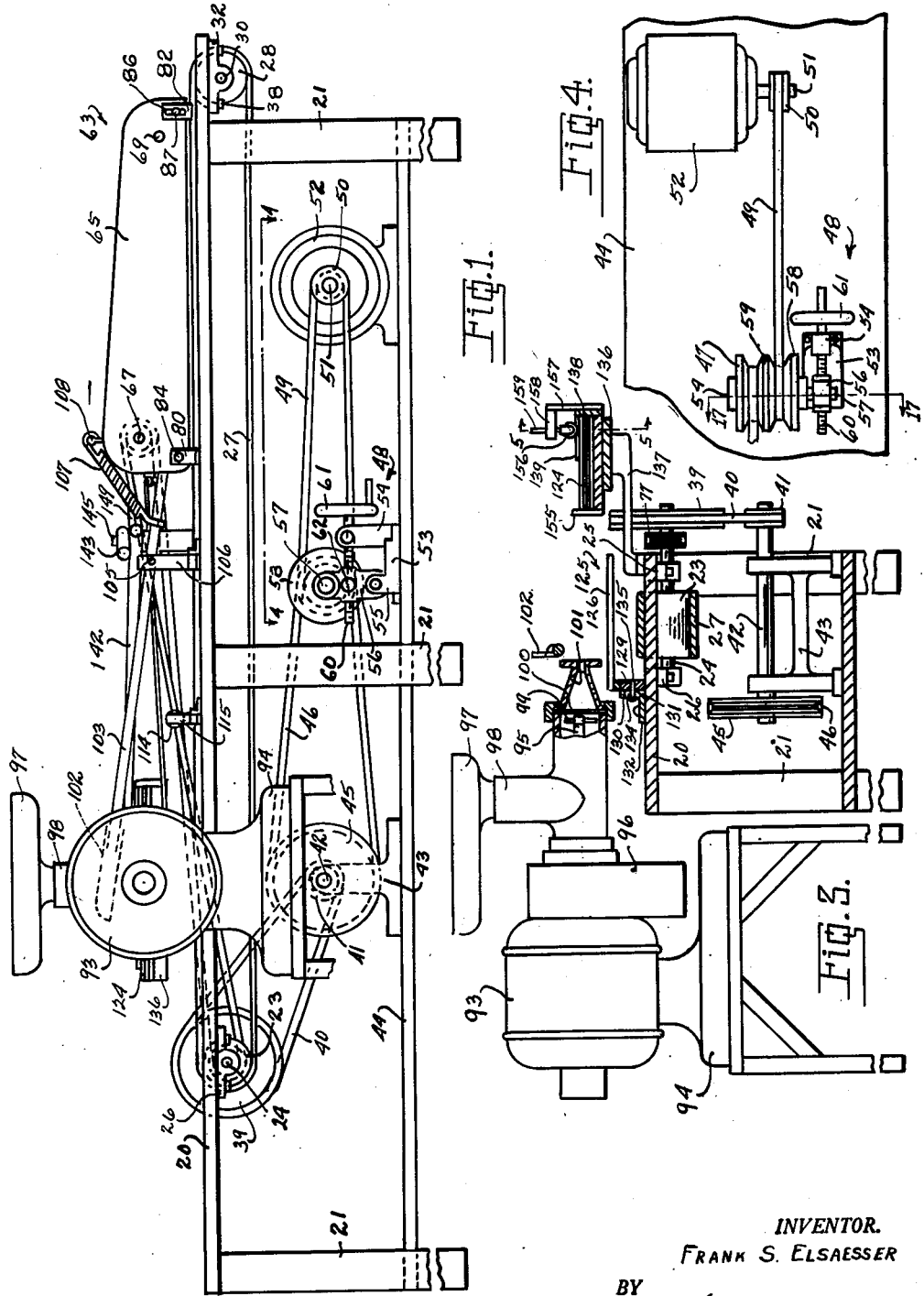
INVENTOR.
FRANK S. ELSAESSER
BY
Joseph A. Pave
Attorney

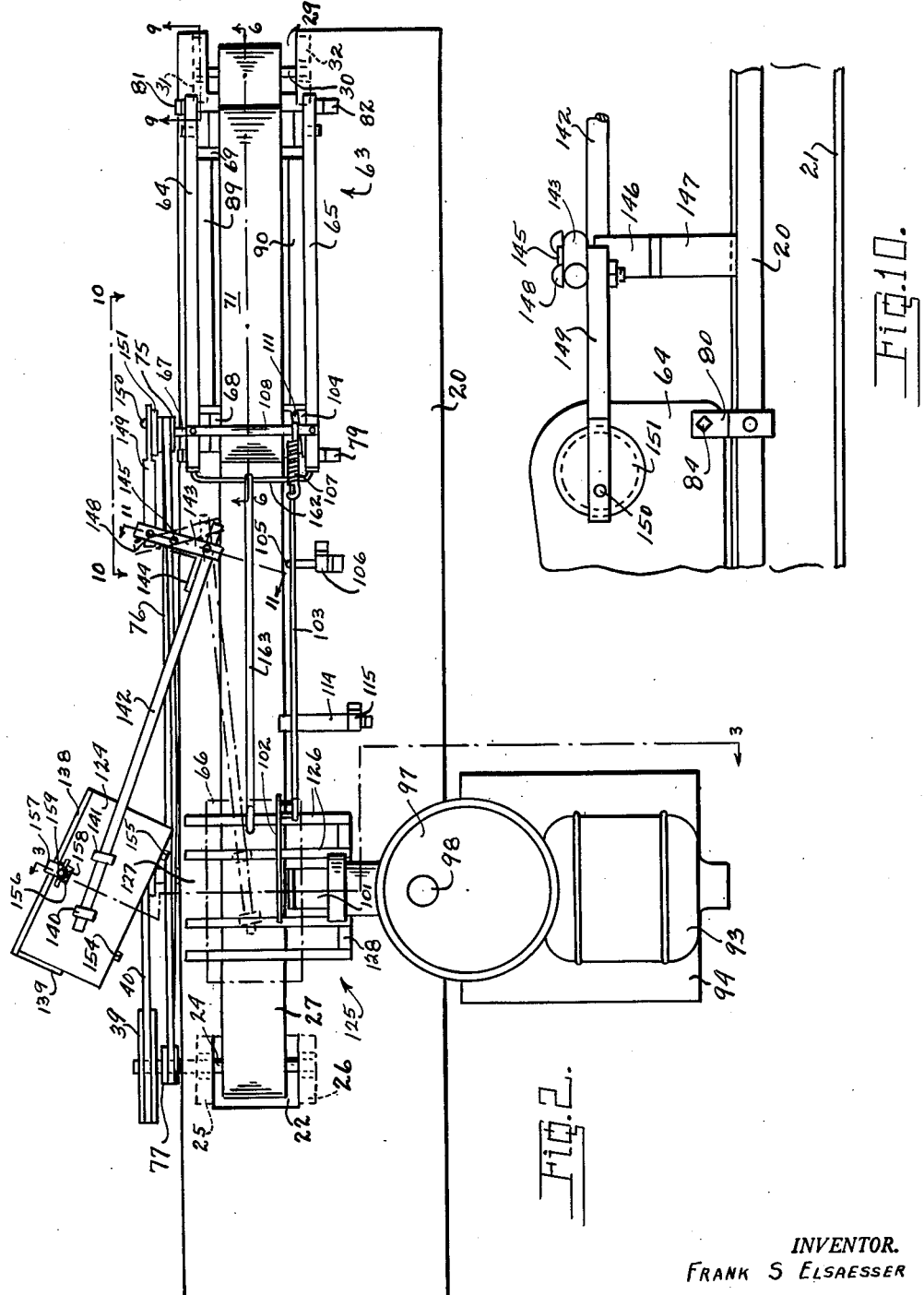

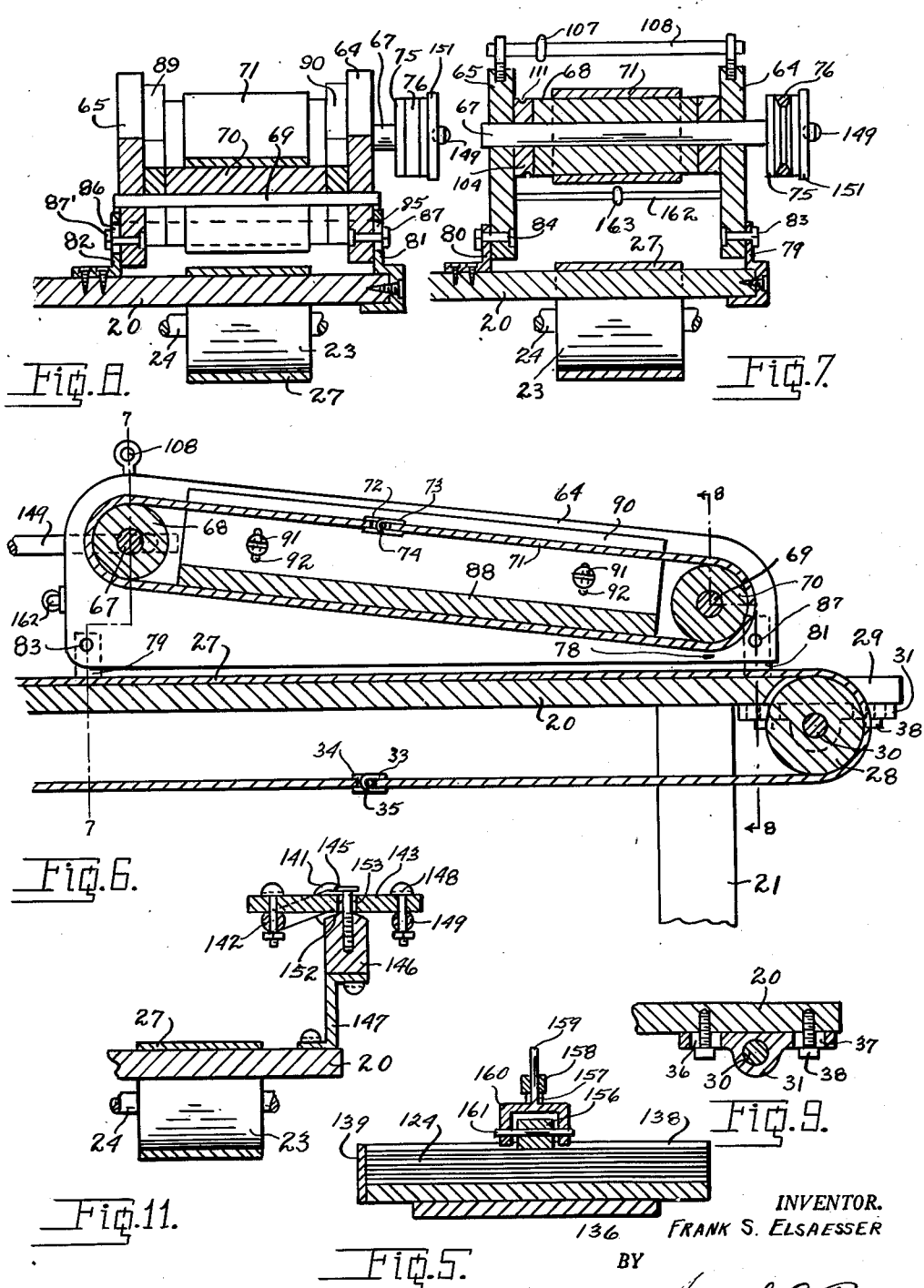

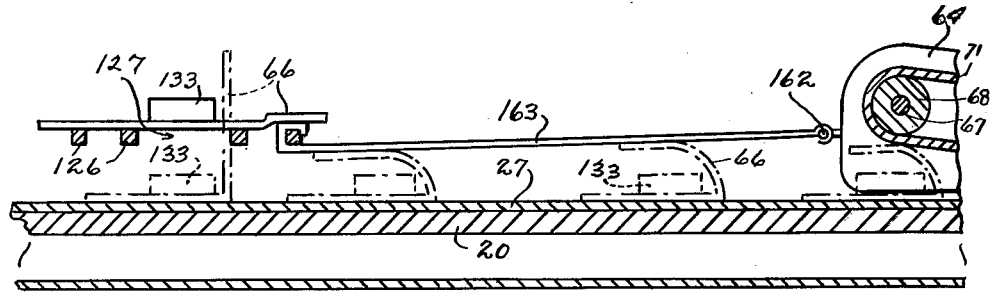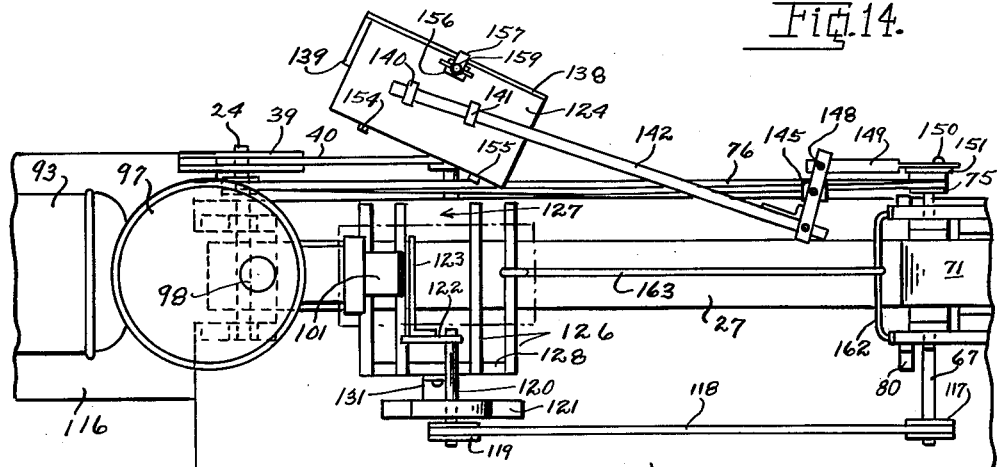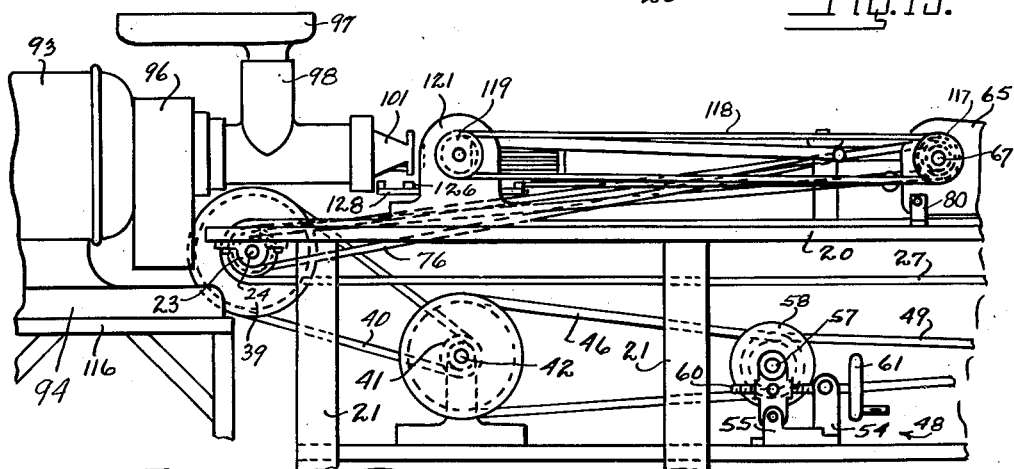

Patented Apr. 14, 1953

2,634,458

UNITED STATES PATENT OFFICE 2,634,458

HAMBURG STEAK PATTY FORMING MACHINE

Frank S. Elsaesser, Cincinnati, Ohio

Application October 11, 1946, Serial No. 702,596

15 Claims. (Cl. 17—32)

This invention relates to improvements in Hamburg steak patty forming machines and particularly to a machine for forming the patty as used in cooking or frying the same.

This invention is an improvement on applicant's co-pending application Serial No. 593,285 filed May 11, 1945, now Patent No. 2,509,971.

The machine of this invention rapidly produces Hamburg steak patties as well as other meat patties such as "country style" pork sausages, and the like.

The machine of this invention is fully automatic in the forming of the Hamburg steak patty in that a quantity of meat is automatically cut from the meat grinder to fall on paper which was automatically positioned to receive the ground meat and which paper is automatically folded onto the meat.

It is therefore the main object of this invention to provide a machine to produce meat patties such as are used in Hamburg steaks, which requires the operator to merely supply the meat to be ground to the meat grinder.

Another object of this invention is the provision of a machine that will accomplish the above object and which is of simple construction and can be operated by an inexperienced operator.

Another object of this invention is the provision of a meat patty forming machine in which the patties are expeditiously produced and in which sanitation is maintained in a high degree.

Another object of this invention is the provision of a machine for producing meat patties automatically and which machine may be adjusted to produce different sizes or weights of patties.

A further object of this invention is the provision of a meat patty forming machine in which its operation may be co-ordinated with the output of a meat grinder whereby meat patties are automatically produced.

A still further object of this invention is the provision of a machine for forming meat patties wherein a quantity of ground meat is automatically severed from the output of a meat grinder, automatically arranging a paper to receive the meat from the grinder and which paper is automatically folded onto the meat, or the meat automatically enfolded in the paper, and automatically compress the quantity of meat into a patty of a desired thickness.

Other objects and advantages of the present invention should be readily apparent by reference to the following specification considered in conjunction with the accompanying drawings forming a part thereof and it is to be understood that any modification may be made in the exact structural details there shown and described, within the scope of the appended claims, without departing from or exceeding the spirit of the invention.

In the drawings:

Fig. 1 is an elevational view of one form of a machine forming the subject matter of this invention, with certain parts broken away to conserve space.

Fig. 2 is a top plan view of the machine illustrated in Fig. 1.

Fig. 3 is a view partly in elevation and partly in section taken on line 3—3 on Fig. 2, with certain parts broken away and certain parts omitted for clearness of illustration.

Fig. 4 is a fragmentary plan view of a portion of the power transmitting mechanism as seen from line 4—4 on Fig. 1.

Fig. 5 is an enlarged sectional view through the paper supporting mechanism taken on line 5—5 on Fig. 3 and forming a detail of the invention.

Fig. 6 is an enlarged longitudinal sectional view of the masher mechanism taken on line 6—6 on Fig. 2.

Fig. 7 is a transverse sectional view through the masher mechanism taken on line 7—7 on Fig. 6 looking to the left of said line 7—7.

Fig. 8 is a view similar to Fig. 7 taken through a plane behind that of Fig. 7 on line 8—8 on Fig. 6.

Fig. 9 is an enlarged fragmentary sectional view taken on line 9—9 on Fig. 2 and illustrating a detail of the invention.

Fig. 10 is a fragmentary enlarged elevational view of certain parts of the machine as seen from line 10—10 on Fig. 2.

Fig. 11 is an enlarged fragmentary sectional view taken on line 11—11 on Fig. 2.

Fig. 12 is an elevational view of a cam utilized with the machine of the present invention and forming a detail of the invention.

Fig. 13 is a side or plan view of the cam of Fig. 12.

Fig. 14 is a fragmentary, enlarged longitudinal sectional view of a portion of the machine semi-diagrammatically illustrating certain action thereof during the process of forming a meat patty.

Fig. 15 is a fragmentary top plan view of a portion of the machine illustrated in Fig. 1 but disclosing a modification in its construction and operation.

Fig. 16 is a fragmentary front elevation of the modified machine illustrated in Fig. 15.

Throughout the several views of the drawings, similar reference characters are employed to denote the same or similar parts.

The machine of this invention will find its principal use in restaurants, dining rooms or the like establishments which feature or serve Hamburg steak or "Hamburgers" as they are popularly called. It has been found that Hamburg steak patties can be formed on this machine at a rate requiring but a single attendant that formerly needed three and four persons and that the patties are of uniform physical properties, that is, of the same area, thickness and density whereas formerly each maker developed his own technique which resulted in variations of these properties wherefore, the resulting cooked Hamburg steaks were of different degrees of being done.

The machine comprises a table member 20 supported in any suitable or desirable manner as by legs 21. Intermediate its ends the table 20 is provided with an opening 22 of a size to receive a drum or pulley 23. The pulley 23 is secured to a shaft 24 rotatably mounted in bearings 25 and 26, respectively, located one on each side of the opening 22. Partially encircling the pulley 23 is a belt 27 made of flexible material and adaptable to being washed or otherwise cleaned from time to time. The belt 27 is a conveyor belt for conveying the meat to and through a mashing unit or patty former.

The conveyor belt 27 partially encircles a second drum or pulley 28, located some distance from the pulley 23, for example as shown in the drawings, at one end of the table 20 in a recess 29 provided in said table therefor. The pulley 28 is secured to a shaft 30 rotatably mounted in bearings 31 and 32 secured to the undersurface of the table, respectively, one on each side of the recess 29. The ends of the belt 27 are joined to one another to make it an endless conveyor and this joining may be accomplished in any suitable or desirable manner. As illustrated in the drawings, the joining is effected by providing each end of the belt with projecting metal loops 33 and 34, which interleaf to form a passageway through which a pin 35 passes. By this construction, the ends of the belt may be readily separated from one another by removing the pin 35 and the belt removed from the machine for washing or otherwise cleaning.

The bearings 31 and 32 are utilized to supply the belt 27 with the necessary tension and to take up any slack that may develop therein. To accomplish this the said bearings or bearing brackets 31 and 32 are each provided with elongated apertures 36 and 37 through which mounting bolts 38 pass and whereby the brackets, with their shaft 30, may be adjusted toward and from the shaft 24.

The drum or pulley 23 is the driving pulley for the conveyor belt 27 and has its shaft 24 projecting beyond one side of the table 20 to have secured thereto a pulley 39 about which passes transmission belt 40. The transmission belt 40 also passes around pulley 41 secured to one end of intermediate shaft 42. The intermediate shaft 42 is rotatably mounted in a bracket 43 shown as secured to a shelf or the like 44 spaced below the table 20 and held in position by the legs 21. Secured to the other end of the intermediate shaft 42 is a pulley 45 having extending therearound a transmission belt 46. This transmission belt 46 also extends around a pulley 47 of a speed changing unit indicated in the drawings, in general, by the reference numeral 48. A further transmission belt 49 extends about a second pulley 58 of the speed changing unit 48 as well as about the driving pulley 50 on the free end of the motor shaft 51 of electric motor 52.

It should be noted that the motor pulley 50, intermediate shaft pulleys 41 and 45, and final driven or conveyor belt pulley 39 are of different diameters which is for the purpose of reducing the speed of rotation of drum pulley 23 from that of the motor 52 and that any other speed reducing transmission device may be arranged between the driving motor and said conveyor belt driving pulley or drum 23. It should further be noted that, some speed changing mechanism, such as that indicated above by the reference numeral 48, must be included in the transmission for a purpose which will later be made clear.

The speed reducing mechanism 48, per se, forms no part of the present invention except in combination and is of a type such as disclosed in United States Patents Nos. 2,151,189 and 2,186,477. Generally this speed reducing mechanism comprises a bracket 53 bolted or otherwise secured to the shelf 44 having upstanding from its opposite ends posts 54 and 55. Mounted in the post 55 for oscillatory movement is a carrier 56 rotatably supporting at its upper end a shaft 57. It is on the shaft 57 that the pulleys 47 and 58 are mounted. Said pulleys are respectively formed on opposite sides of a sliding pulley member 59 as fully explained in the patents above referred to. Briefly it is the relative position of the pulley member 59, axially of the shaft 57, that determines the effective diameter of the pulleys 47 and 58. This effective seizing of these pulleys 47 and 58 is brought about by the swinging of the carrier 56. In order to swing or oscillate carrier 56, the post 54 has journaled therein, against axial movement, a screw 60 carrying at its outer end a hand wheel 61 for effecting its rotation. The screw 60 is threaded through a nut 62 oscillatably carried by the carrier 56.

It is believed the operation of this speed changer is readily understood as an oscillation or movement of the carrier 56 away from the motor 52 will cause a tightening of transmission belt 49 and a corresponding loosening of transmission belt 46 whereby the intermediate pulley member 59 will shift away from the observer as seen in Fig. 1 causing a reduction in the diameter of the pulley 58 and an increase in the pulley 47, while an oscillation or movement of the carrier 56 in the opposite direction will reversely shift the intermediate pulley member 59 and reversely effect the diameters of pulleys 58 and 47.

It will be noted that the conveyor belt driving pulley or drum 23 and the driven pulley or drum 28 are mounted to be tangent to the table top wherefore, the upper layer or reach of the conveyor belt moves along the said table top. Near the driven drum or pulley 28 the conveyor belt 27 passes beneath the mashing or flattening mechanism indicated in general by the reference numeral 63. This mashing or flattening mechanism gives the final shape or form, specifically thickness, to the Hamburg steak patty.

The meshing or flattening mechanism 63 comprises side members 64 and 65 spaced from one another a distance to permit a paper sheet 66 to pass between them. Rotatably mounted in the side members 64 and 65, near their left ends, as seen in Fig. 6, and some distance above the conveyor belt 27, is a shaft 67 having secured to it a drum or pulley 68. The masher side members 64 and 65 near their rear ends also have rotatably mounted therein a shaft 69, which has secured to it a drum or pulley 70. It will be noted, particularly from Fig. 6, that the shaft 69 is located much nearer the conveyor belt than shaft 67. Extending around the drums or pulleys 68 and 70 is a belt 71, made endless by joining the ends thereof to one another through the usual belt lacing comprising metal loops 72 and 73 extending respectively from each end of the belt 71 toward the other and interleaved to form a passageway through which a connecting pin 74 passes. By this construction the said belt 71 may be removed from the masher mechanism for cleaning and for replacement purposes as was above described with reference to the conveyor belt 27.

The drum or pulley 68 is the driving pulley while the drum or pulley 70 is the driven or idler pulley for which reason the shaft of drum 68 extends beyond the masher side to have secured to it a pulley 75 partially encircled by a transmission belt 76. The transmission belt 76 also partially encircles a second pulley 77 on the shaft 24 of the conveyor belt driving drum 23. The transmission belt pulleys 75 and 77 are of such diameter that the belts 27 and 71 have substantially the same surface rate of travel. As will be seen in Fig. 6, the upper layer or reach of conveyor belt 27 is directly below and opposed to the bottom layer or reach of masher belt 71. These belt layers or reaches are to travel in the same direction, that is, from left to right, as seen in the drawings wherefore, the transmission belt 76 is twisted, as seen in Figs. 1 and 2, causing the shaft 24 to rotate clockwise and the shaft 68 to rotate counter-clockwise.

As noted above and as can be seen from Fig. 6, the shaft 67 is a greater distance from belt 27 than the shaft 69 thereby providing a contracting throat which constitutes the masher or flattening chamber with the final thickness or thinness of the Hamburg steak determined by the space between belts 27 and 71 at the point where the belt 71 passes around the lowest point of the drum or pulley 70 and this point is indicated in the drawings by the reference character 78.

The operation of the masher 63 is as follows:

The conveyor belt 27 carries a quantity of ground meat into the large end of the mashing or flattening chamber and the ground meat is engaged on its upper side after a paper has been placed thereon, as will later be made clear, by the belt 71, which being driven assists in moving the said meat through the chamber. Since the said belts 27 and 71 gradually converge toward one another, the meat is likewise reduced in thickness until the narrowest point 78 of the chamber is reached whereupon the driven or idler drum 70 completes the flattening of the ground meat into a patty ready for cooking. The original quantity of ground meat that entered the flattening chamber was the right amount to produce the desired Hamburg steak.

The masher mechanism 63 is secured in place by a pair of brackets 79 and 80, respectively, connecting the front ends of side members 64 and 65 to the table top 20 and by brackets 81 and 82 which, respectively, secure the rear ends of said side members to the table top. The front brackets are permanently secured to the table and have a pivotal connection at 83 and 84 with their respective side members, while the brackets 81 and 82 are likewise permanently secured to the table and they have an adjustable connection at 85 and 86 with their respective side members. This adjustable connection consists of a slot in each bracket 81 and 82 through each of which passes a clamp bolt 87, 87'. From this it will be seen that the exit throat 78 of the masher chamber may be varied in thickness by adjusting the masher mechanism about the pivots 83 and 84 to raise or lower the drum or pulley 70 relative to the conveyor belt 27.

In order to effect the mashing or flattening of the meat as it passes through the masher chamber, the lower portion or reach of the belt 71 is backed up by a pressure board or buckboard 88. The pressure board 88 may be mounted in position through wings 89 and 90 respectively, projecting from the sides thereof and having passing therethrough, into the masher side members 64 and 65, bolts 91. By providing the pressure board wings 89 and 90 with elongated apertures 92 for the bolts 91 the pressure board 88 may be adjusted toward and from the conveyor belt 27.

The quantity of meat to be formed into a patty is cut from the stream being delivered from a meat grinder which is positioned to have its outlet in operative relation to the paper 66. There is nothing new or novel in the meat grinder, per se, except as to its support in relation to the patty forming machine.

The meat grinder as disclosed in the drawings comprises a motor 93 secured to or mounted on a base 94 for driving a worm feed 95. The worm 95 is driven from the motor 93 through a speed reducing mechanism in a housing 96. The meat to be ground is disposed on a tray 97 and fed through a funnel or sleeve 98 to the worm 95. The worm 95 forces the meat past a cutter 99 at the end of the worm and through the shredding plate 100. The shredded or ground and severed meat particles pass through a nozzle 101 to be extruded from the grinder.

Operating in front of the nozzle 101 is a knife 102 which periodically severs the extruded meat from that still within the grinder. The knife 102 is timed to operate periodically, that is, after a predetermined and desired amount of ground meat has been extruded from the nozzle 101. The knife 102 may be actuated in any suitable or desirable manner such as by reciprocating past the nozzle opening or by rotating relative thereto; in each case as the knife passes the nozzle opening a quantity of meat is deposited onto the paper and conveyor belt for subjection to the masher mechanism.

The means for reciprocating the knife 102 and illustrated in Figs. 1, 2, 12 and 13 comprises an arm 103 having the knife 102 at one end thereof and its other end in contact with a peripheral cam 104. The arm 103 is pivoted at 105, intermediate its ends, to a post or bracket 106. A spring 107 has its one end connected to the arm 103 at a point between the pivot 105 and cam 104 for yieldingly retaining the end of the arm in contact with the cam and for which purpose the spring 107 has its other end connected, conveniently, to the masher mechanism 63 as to a bar 108 carried by the masher mechanism side members 64 and 65.

The cam 104 is illustrated clearly in Figs. 12 and 13 and is essentially a disc with a vertical step-off 109 that terminates in a shoulder 110. The shoulder 110, illustrated most clearly in Fig. 12, inclines from the inner side to the outer side thereof and in effect constitutes a second cam. Extending around the periphery of the cam is a spiral groove 111 having an entrant portion 112 in the shoulder cam 110, at a point adjacent the outer side of the cam, and having an exit 113 at the cam step-off 109 and located adjacent the inner face of said cam.

The operation of the knife actuating mechanism is as follows:

Assuming the knife 102 to be in the position illustrated in Figs. 1 and 2 and the cam 104 in the position illustrated in Fig. 13 and rotating in a counter-clockwise direction with the end of the arm 103 remote from the knife 102 in the spiral groove 111 and, at this time, near the exit 113 of said groove. Continued rotation of the cam 104 causes the arm, through the tension in the spring 107, to snap down the step-off 109 causing the knife 102 to pass the outlet of the nozzle 101 and sever the meat projecting from said nozzle.

It will be appreciated that meat is constantly being extruded from the nozzle 101 whereby the knife 102 cannot pass directly upwardly through its path of descent otherwise a second and undesirable severing of the extruded ground meat will take place. Therefore, the end of the arm upon passing over the step-off 109 and engaging the cam shoulder 110 is forced outwardly of the masher, or toward the observer as seen in Figs. 1 and 2, thereby swinging the knife 102 in the opposite direction or away from the observer, as seen in said Figs. 1 and 2. The end of the arm 103 upon reaching the lowermost point of the cam shoulder 110 is picked up by the spiral groove 111 by entering the entrant portion 112 of said groove and immediately raised to its uppermost position as seen in Fig. 1, however, through a plane remote from the nozzle 101 as determined by the width of cam shoulder 110.

In the embodiment disclosed the cam 104 is located between the side member 65 of the masher mechanism and the masher belt drum 68 wherefore the end of the arm 103 is prevented by the shoulder cam 10 from being projected beyond the sides of the cam 104. It is understood that flanges could readily be applied to the cam sides to thereby form a channel peripherially of the cam for confining the said end of the knife arm. It should be here noted that the rotation of the cam 104 and its actuation of the arm 103 is in timed relation to the paper feed or depositing mechanism as will later be made clear. It will be appreciated that the arm 103 has considerable snap and to limit its movement and particularly dampen vibration therein; use is made of a stop 114 to engage the arm 103 after it has passed the nozzle 101 and which stop 114 projects from a post 115 upstanding from the table 20.

Hamburg steaks vary in weight and their size are generally determined by the number thereof formed from a pound of ground Hamburg meat. Since the knife 102 is operated from a source of power independent of the source of power for the grinding machine and, as noted above, the latter constantly produces ground meat, it is necessary to actuate the knife at shorter intervals if smaller or less expensive Hamburg steaks are desired than if larger ones are required. It is for this reason that the conveyor belt transmission includes the speed changing mechanism 48. From this it will be seen that since all of the cutoff mechanism, mashing mechanism, and as later will be made clear, the paper positioning mechanism is operated from the same source their speed and rate of operation can be correlated or adjusted to the constant speed of the grinder motor for producing the desired results, either quantity of Hamburg steaks per unit of time, or the size thereof.

Instead of utilizing a reciprocating knife, a rotary knife may be employed such as disclosed in Figs. 15 and 16. This modification requires the shifting of the meat grinder mechanism from a position at the front of the machine to the end thereof adjacent the conveyor belt driving drum 23. In this case the grinder mechanism could be mounted on the table 20 but preferably is separately mounted on its own stand or support 116 in the said manner as when used at the front of the machine. The grinder operation is exactly the same as above disclosed but instead of utilizing a cam 104 the masher driving shaft has secured to it a pulley 117 about which is trained a transmission belt 118 in turn trained about a pulley 119 on the end of a shaft 120. The shaft 120 is rotatably journaled in a suitable bearing 121 secured to and upstanding from the table 20. The inner end of the knife shaft 120 has secured to it a crank arm 122 having the inner end of a knife 123 secured thereto.

It is believed obvious that rotation of the shaft 120 causes the knife 123, during each revolution, to sever a quantity of meat from the stream being constantly extruded from the nozzle 101. The rate of rotation of the knife 123 is controlled and adjustable by the variable speed mechanism 48 to control the weight of the subsequent Hamburg steaks all as above described. It should also be noted that the position of the knife 123, that is the time it is effecting its severance of the quantity of meat, is timed with the paper positioning mechanism so that a paper is positioned prior to the cutoff of the meat quantity, and it should be here noted that the parts are in proper timed position as illustrated in Fig. 15.

The paper 66, shown in dot and dash lines in Fig. 2 is in position to receive the ground meat to be formed into the patty. The individual papers are shifted from a pile or stack 124 onto the supporting frame indicated in general by the reference numeral 125. This supporting frame 125 comprises a series of bars 126 which extend transversely of the conveyor belt 27 in spaced apart relation with a larger opening or space 127, between said bars at substantially the midpoint of the supporting structure. The transverse bars 126 have their outer ends each joined to a longitudinal member or bar 128 having a depending leg 129. The leg 129 has face contact with the vertical arm 130 of an angle bracket 131 secured to the table 20 through its horizontal arm 132.

The supporting frame 125 is positioned above the conveyor belt 27 a distance to permit the ground meat quantity, hereinafter called ground meat ball, 133 as severed from the grinder to pass freely thereunder and since Hamburg steaks are made to different sizes, requiring different quantities of meat, or sizes of meat ball, the said frame 125 is adjustable toward and from the conveyor belt 27. To accomplish this adjustment the vertical arm 130 of the bracket 131 is provided with an elongated aperture 134 through which passes the clamp bolt 135 into a tapped aperture in the leg 129.

The stack 124 of individual papers 66 is disposed on a shelf 136 behind the table 20 and which shelf, as seen in Fig. 2, has its longitudinal axis angularly disposed to the longitudinal axis of the table 20 for a purpose to be made clear.

The shelf 136 may be supported relative to the table in any suitable or desirable manner preferably with the shelf at least as high above the table 20 and conveyor 27 as the paper support frame 125 is above said table and conveyor, for example, as shown in the drawings, by the arm 137. In order to prevent disarrangement of the papers 66 from the stack 124 the shelf is provided at its rear with a rail 138 and at its one end with a second rail 139.

The individual papers 66 are removed from the stack 124 automatically by one or more pickers 140 and 141 carried by the outer end of an arm 142. The arm 142 is secured to cross member 143 to have their axes in a definite angular relation and which connection may be accomplished in any suitable or desirable manner as by bracket 144. The cross member or cross bar 143 is pivoted at 145, intermediate its ends, to a post 146 upstanding from table 20. The post 146 may be secured to the table in any suitable or desirable manner as by bracket 147. The other end of the cross bar 143 has a pivotal connection at 148 with the free end of a piston 149. As seen most clearly in Fig. 10, the piston 149 is rotatably mounted at 150 eccentrically of a disc 151 in the manner of an eccentric crank. The disc 151 is secured in any suitable or desirable manner to the flattening mechanism driving shaft 67 as by keying the same thereto or by bolting it to the pulley 75.

By reference particularly to Figs. 2, 10, 11, it will be appreciated with the shaft 67 rotating in counterclockwise direction the piston 149 will be actuated to the left, as seen in Fig. 2, and to the right as seen in Fig. 10, during the first half of a revolution of the disc 151, for oscillating the cross arm 143 in counterclockwise direction and thereby swing the arm 142 from the solid line position thereof to the phantom line position of Fig. 2. This movement of the arm 142 through the pickers 140 and 141 moves the uppermost paper 66 from the stack 124 onto the support frame 125. The arm 142 exerts a slight pressure on the uppermost paper through the pickers and to accomplish this the upper surface of the post 146 is rounded or arched as at 152 and the cross bar pivot 145 passes through an enlarged aperture 153 in the said cross bar 143.

The operation of these parts is as follows:

The disc 151 rotating clockwise, as seen in Fig. 10, tends to elevate the pivot or crank 150 thereby tending to raise the piston 149. The piston acting on one end of the cross bar 143, tends to rock the said cross bar in a counterclockwise direction, as viewed from Fig. 11, about the pivot 145 and actually does so to the extent permitted by the clearance of the pivot aperture 153. This action of the cross bar 143 causes the arm 142 to be depressed so that its pickers 140 and 141 grip the uppermost paper 66 of the stack. When the disc 101 reaches the end of a half revolution, the arm 142 is in its phantom line position. The disc 151 in going through its second half revolution reacts oppositely on its crank pin or pivot 150 and piston 151 thereby tending to reversely oscillate the cross bar 143 and actually effect the raising of the arm 142 to a point to pass above the paper stack 124. Continued rotation of the disc 151 continues the operation of the arm 142 as above described to deposit a single paper from the stack onto the frame 125 for each rotation of the disc 151.

To assist in preventing the discharge or transfer of more than one sheet of paper 66 at a time, the shelf has upstanding from its front edge a pair of light springs 154 and 155 which hold back the stack but do not interfere with gripping action between the grippers 140 and 141 and the uppermost paper sheet while a transfer is taking place. To further assist in maintaining the stack in proper position a light weight is placed on top of the stack comprising a hold down roller 156. The hold down roller 156 is freely rotatable and any suitable or desirable means may be employed to keep same in position while imposing no restraint against movement of the uppermost paper sheet by the arm 142 and its pickers. The means shown in the drawings for this purpose comprise a bracket 157 carried by the shelf 136 and having a guide 158 at its upper end through which a stem 159 freely passes. The stem 159 has at its lower end a forked head 160 carrying an axle 161 on which the hold down roller 156 is freely rotatable.

From the foregoing it will be noted that the paper feed mechanism as well as the cutoff knife actuating mechanism are driven from the same shaft, namely, the masher mechanism driving shaft 67 wherefore they are operated in timed relation thereby permitting the placement of a paper 66 before a meat ball is severed from the meat grinder stream. It should further be noted that the paper 66 is of a size to both underlie and cover the ground meat ball wherefore the patty is protected both above and below itself. It will also be noted that the meat ball is automatically deposited on the paper and as will presently be made clear the paper is automatically placed thereover wherefore the handling of the Hamburg steak patty is protected against contamination from any and every source after the meat is placed in the grinder.

After a paper sheet 66 is deposited on the support 125 the cut-off knife is operated to deposit a quantity of ground meat or ground meat ball 133 thereon over the enlarged space 127 in the support frame. The weight of the ground meat carries the paper with it through the said space 127 to the conveyor belt 27 therebelow. As pointed out above, the paper sheet 66 is large enough to cover the meat and the action of the meat and paper dropping onto the conveyor belt 27, causes the covering portion of the paper to be disposed normal to the belt and to be so positioned by the adjacent transverse bar 126 as illustrated in Fig. 14. The conveyor belt being constantly driven carries the ground meat and paper toward the flattening mechanism beneath the transverse bars 126. As the ground meat passes beneath these bars 126, the covering portion of the paper is folded thereabove. If the masher or flattening mechanism were located adjacent the support frame 125, the ground meat with its paper in covering position would immediately be pressed into engagement, but to permit an inspection and observation of the movement of these parts, the mechanism 63 is somewhat removed from the support frame 125 and means are provided to insure the covering portion of the paper remaining in position and preventing this portion of the paper from assuming its natural flat position until the mashing or flattening mechanism is reached.

Accordingly, the mashing or flattening unit 63 has secured to the forward ends of its side members and extending transversely of the belt 27, a rod 162 to which one end of a guide or paper hold down member 163 is attached. The other end of the guide 163 is attached to the nearest of the transverse bars 126 and the guide extends longitudinally of the conveyor belt 27 substantially down its longitudinal center as illustrated most clearly in Fig. 2. The action or operation of the guide 163 is clearly illustrated in Fig. 14 and holds the covering half of the paper of successive ground meat and paper units in position until they enter the masher and flattening unit throat.

From the foregoing it will now be appreciated that there has been provided a Hamburg steak patty forming machine which automatically produces Hamburg steak patties to a given size and produces the same in an expeditious and sanitary manner. It will further be noted that there has been provided a machine which otherwise fulfills the objects initially set forth.

What is claimed is:

1. In a device of the class described the combination with a meat grinder having an outlet, of a supporting table, a conveyor belt on said table beneath the grinder outlet, patty forming means on said table in operative relation to the conveyor belt, means for arranging a paper relative to the conveyor belt to receive a quantity of ground meat from the grinder, and a reciprocating knife reciprocable past the grinder outlet to sever a quantity of ground meat from the stream being extruded from the grinder.

2. In a device of the class described the combination with a meat grinder having an outlet, of a supporting table, a conveyor belt on said table beneath the grinder outlet, patty forming means on said table in operative relation to the conveyor belt, means for holding a stack of individual papers adjacent the conveyor belt, means for arranging said papers individually from said stack relative to the belt to receive a quantity of ground meat after it is severed from the stream being extruded from the grinder, a reciprocating knife reciprocable past the grinder outlet to sever a quantity of ground meat from the stream being extruded from the grinder, and means for synchronizing the operation of the paper arranging means and the reciprocations of the knife whereby the knife reciprocates only after the paper has been positioned.

3. In a device of the class described the combination with a meat grinder having an outlet, of a supporting table, a conveyor belt on said table beneath the grinder outlet, patty forming means on said table in operative relation to said conveyor belt, means for arranging a paper relative to the conveyor belt to receive a quantity of ground meat from the grinder, a knife reciprocable downwardly adjacent the grinder outlet to sever a quantity of ground meat from the stream being extruded from the grinder and said knife being reciprocable upwardly in a plane outwardly of said grinder outlet preparatory to the next downward cutting reciprocation of said knife, and means for controlling and effecting the said reciprocation of the cutoff knife.

4. In a device of the class described the combination with a meat grinder having an outlet, of a supporting table, a conveyor belt on said table beneath the grinder outlet, patty forming means on said table in operative relation to said conveyor belt, means for arranging a paper relative to the conveyor belt to receive a quantity of ground meat from the grinder, a knife reciprocable downwardly adjacent the grinder outlet to sever a quantity of ground meat from the stream being extruded from the grinder and said knife being reciprocable upwardly in a plane outwardly of said grinder outlet preparatory to the next downward cutting reciprocation of said knife, an arm pivotly mounted intermediate its ends having the knife secured to one end, and a cam cooperating with the other end of the arm to cause an oscillation of the arm about its pivot and thereby effect and control the cutoff and return reciprocations of the knife.

5. In a device of the class described the combination with a meat grinder having an outlet, of a supporting table, a conveyor belt on said table beneath the grinder outlet, patty forming means on said table in operative relation to said conveyor belt, means for arranging a paper relative to the conveyor belt to receive a quantity of ground meat from the grinder, a knife reciprocable downwardly adjacent the grinder outlet to sever a quantity of ground meat from the stream being extruded from the grinder and said knife being reciprocable upwardly in a plane outwardly of said grinder outlet preparatory to the next downward cutting reciprocation of said knife, an arm pivotly mounted intermediate its ends having the knife secured to its one end, a cam having peripheral contact with the other end of the arm and including a step-off portion to permit the cutoff reciprocation, a cam shoulder at the base of the step-off for shifting the knife from the plane of cutoff reciprocation to the plane of return reciprocation and effecting the said knife return reciprocation, and a groove in said cam periphery for returning the knife to its cutoff reciprocation plane, and yielding means for yieldingly holding the end of the arm in peripheral contact with the cam.

6. In a device of the class described the combination with a meat grinder having an outlet, of a supporting table, a conveyor belt on said table beneath the grinder outlet, patty forming means on said table in operative relation to said conveyor belt, means for arranging a paper relative to the conveyor belt to receive a quantity of ground meat from the grinder, a knife reciprocable downwardly adjacent the grinder outlet to sever a quantity of ground meat from the stream being extruded from the grinder and said knife being reciprocable upwardly in a plane outwardly of said grinder outlet preparatory to the next downward cutting reciprocation of said knife, an arm pivotly mounted intermediate its ends having the knife secured to its one end, and a cam member cooperating with the other end of the arm and including a cam portion to permit the cutoff reciprocation, a cam portion for shifting the knife from the plane of cutoff reciprocation to the plane of return reciprocation, a cam portion for effecting the knife return reciprocation, and a cam portion for returning the knife to its cutoff reciprocation plane.

7. In a device of the class described the combination with a meat grinder having an outlet through which a stream of ground meat is being extruded, of cut-off means for periodically severing a quantity of ground meat, sufficient to make a ground meat patty, from said stream, means below the grinder outlet and cut-off means to receive the severed quantity of ground meat and transport it from the vicinity of the grinder outlet, a power source operating the meat grinder, a separate power source for the severing and transporting means, and adjustable means in one of said power sources for correlating said power sources whereby the rate of severance and transportation may be varied with respect to the rate of extrusion from the grinder.

8. In a device of the class described the combination with a meat grinder having an outlet through which a stream of ground meat is being extruded, of cut-off means for periodically severing a quantity of ground meat, sufficient to make a ground meat patty, from the said stream, means below the grinder outlet and cut-off means to receive the severed quantity and transport it from the vicinity of the grinder outlet, a power source operating the grinder, a separate power source operating the severing and transporting means including a transmission train, and adjustable means in said transmission train for changing the rate of operation thereof and thereby changing the rate of severance and transportation with respect to the rate of extrusion from the grinder.

9. In a device of the class described the combination with a meat grinder having an outlet through which a stream of ground meat is being extruded, of cut-off means for periodically severing a quantity of ground meat, sufficient to make a ground meat patty, from the stream, means below the grinder outlet and cut-off means to receive the severed quantity of ground meat and transport same from the vicinity of the grinder outlet, power operated means for arranging a piece of paper relative to the receiving and transporting means on which the severed quantity of ground meat is deposited by the cut-off means, a power source operating the meat grinder, a separate single power source operating the paper arranging means, the severing means and the receiving and transporting means including a transmission train, and means in said transmission train for changing the rate of operation thereof and thereby changing the rate of operation of the paper arranging means, the rate of severance of the ground meat and the rate of transportation all with respect to the rate of extrusion from the grinder.

10. In a device of the class described the combination with a meat grinder having an outlet from which a stream of ground meat is extruded, of a supporting table above which the meat grinder outlet is located, a conveyor belt constantly moving on said table beneath the grinder outlet, cut-off means periodically cutting off a quantity of ground meat, each sufficient to form a patty, from the extruded ground meat stream, paper support means below the cut-off means supporting paper relative to the conveyor belt receiving the quantity of ground meat as severed from the stream for deposition, paper and meat as a unit, onto the conveyor belt, and a patty forming mechanism on said table in operative relation to the conveyor belt to which the ground meat is transported by the conveyor belt.

11. In a device of the class described the combination with a meat grinder having an outlet from which a stream of ground meat is extruded, of a supporting table above which the meat grinder outlet is located, a conveyor belt constantly moving on said table beneath the grinder outlet, cut-off means periodically cutting off a quantity of ground meat, sufficient to make a ground meat patty, from the stream of extruded ground meat, means holding a stack of individual papers disposed to one side of the conveyor belt, paper support means below the cut-off means receiving and supporting a paper relative to the conveyor belt to receive the quantity of ground meat as severed from the stream for deposition, paper and meat as a unit, onto the conveyor belt, and a patty forming mechanism on the table in operative relation to the conveyor belt to which the portion of ground meat is moved by the conveyor belt.

12. In a device of the class described the combination with a meat grinder having an outlet from which a stream of ground meat is extruded, of a supporting table above which the meat grinder outlet is located, a conveyor belt constantly moving on said table beneath the grinder outlet, cut-off means periodically cutting off a quantity of ground meat, sufficient to make a ground meat patty, from the stream of extruded ground meat, means holding a stack of individual papers disposed to one side of the conveyor belt, paper support means below the cut-off means receiving and supporting a paper relative to the conveyor belt to receive the quantity of ground meat as severed from the stream for deposition, paper and meat as a unit, onto the conveyor belt, means arranging the papers individually from the stack onto the paper support means, and a patty forming mechanism on the table in operative relation to the conveyor belt to which the portion of ground meat is moved by the conveyor belt.

13. In a device of the class described the combination with a meat grinder having an outlet from which a stream of ground meat is extruded, of a supporting table above which the meat grinder outlet is located, a conveyor belt constantly moving on said table beneath the grinder outlet, cut-off means periodically cutting off a quantity of ground meat, sufficient to make a ground meat patty, from the stream of extruded ground meat, means holding a stack of individual papers disposed to one side of the conveyor belt, each paper of a size to underlie and overlie the quantity of meat and meat patty to be subsequently formed, paper supporting means below the cut-off means receiving and supporting a paper relative to the conveyor belt to receive the quantity of ground meat severed from the stream for deposition, paper and meat as a unit, onto the conveyor belt, means arranging the papers individually from the stack onto the paper support means, a patty forming mechanism on the table in operative relation to the conveyor belt to which the portion of ground meat is moved by the conveyor belt, and means for folding the paper onto the ground meat prior to subjection to the action of the patty forming mechanism.

14. In a device of the class described the combination with a meat grinder having an outlet from which a stream of ground meat is extruded, of a supporting table above which the meat grinder outlet is located, a conveyor belt constantly moving on said table beneath the grinder outlet, a knife rotatable in a circle to pass the grinder outlet to periodically sever a quantity of ground meat, sufficient to make a ground meat patty, from the stream being extruded from the grinder, and paper support means below the knife supporting a paper relative to the conveyor belt to receive a quantity of ground meat as severed from the stream for deposition, paper and meat as a unit, onto the conveyor belt.

15. In a device of the class described the combination with a meat grinder having an outlet from which a stream of ground meat is extruded, of a supporting table above which the meat grinder is located, a conveyor belt constantly moving on said table beneath the grinder outlet, a knife rotatable in a circle to pass the grinder outlet to periodically sever a quantity of ground meat from the stream, means holding a stack of individual papers on said table adjacent the conveyor belt, paper support means for supporting said papers, individually, from said stack relative to the conveyor belt to receive a quantity of ground meat after it is severed from the stream for deposition, paper and meat as a unit, onto the conveyor belt, means arranging the papers individually from the stack onto the paper support means, and means for synchronizing the operation of the paper arranging means with the rotation of the knife whereby the paper is positioned during the knife rotation and prior to the cut-off thereby.

FRANK S. ELSAESSER.

References Cited in the file of this patent

UNITED STATES PATENTS

| Number | Name | Date |
|---|---|---|
| 633,865 | Linkiewicz | Sept. 26, 1899 |
| 1,611,244 | Schmidt | Dec. 21, 1926 |
| 1,881,171 | Cooley | Oct. 4, 1932 |
| 1,915,135 | Schmidt | June 20, 1933 |
| 2,070,850 | Trabold | Feb. 16, 1937 |
| 2,105,211 | Bessonette | Jan. 11, 1938 |
| 2,151,189 | Coddington | Mar. 21, 1939 |
| 2,157,949 | Benz | May 9, 1939 |
| 2,226,442 | Rumsey | Dec. 24, 1940 |
| 2,272,457 | Broadmeyer | Feb. 10, 1942 |
| 2,299,314 | Elesh et al. | Oct. 20, 1942 |
| 2,399,153 | Wormeck et al. | Apr. 23, 1946 |

FOREIGN PATENTS

| Number | Country | Date |
|---|---|---|
| 218,836 | Germany | Feb. 11, 1910 |
| 21,517 | France | July 20, 1920 |
| 643,735 | Germany | Apr. 16, 1937 |
| 646,522 | Germany | June 16, 1937 |
| 833,866 | France | July 25, 1938 |
| 692,489 | Germany | June 20, 1940 |